G. C. FANCKBONER.
Harvester.
No. 51,163.                             Patented Nov. 28, 1865.
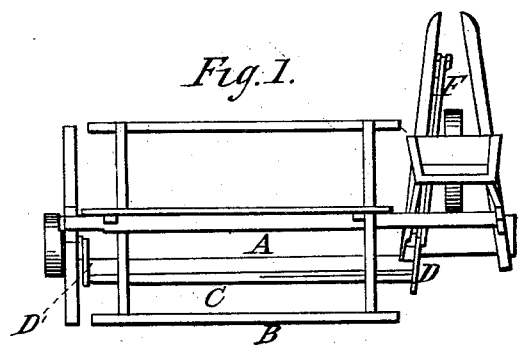
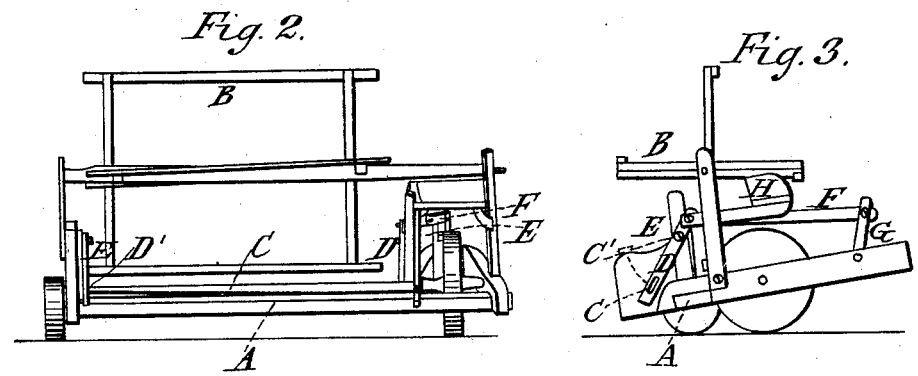
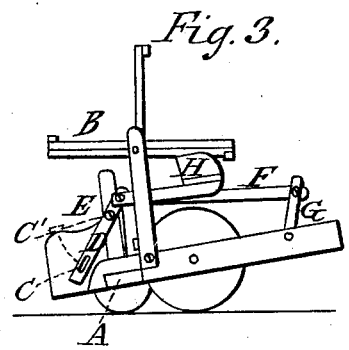
Witnesses:
Inventor:

UNITED STATES PATENT OFFICE.

G. C. FANCKBONER, OF SCHOOLCRAFT, MICHIGAN.

IMPROVEMENT IN HARVESTERS.

Specification forming part of Letters Patent No. 51,163, dated November 28, 1865.

*To all whom it may concern:*

Be it known that I, G. C. FANCKBONER, of Schoolcraft, in the State of Michigan, have invented new and useful Improvements in Harvesters; and I do hereby declare that the following is a full and complete description of the construction and operation of the same, reference being had to the accompanying drawings, making a part of this specification, in which—

Figure 1 is a top view, Fig. 2 is a rear view, and Fig. 3 is a side elevation.

Like letters refer to like parts in the several views.

The nature of my invention relates to a novel mode of discharging the cut grain in gavels of a proper size for binding by a simple manipulation of the driver of the machine.

In the accompanying drawings, A represents the cutter-bar, and B represents the reel. C represents a hinged bar, which receives and supports the cut grain until enough is accumulated for a gavel. This bar C is framed into the arms or levers D D'. These arms are pivoted as shown at E in Fig. 3. The short arm of the lever extends a short distance above the pivot E, where it is joined to a foot-piece or treadle, F, by an articulation. The forward end of the bar F is pivoted to an oscillating standard, G.

Now, when all the parts are in the position shown in Fig. 1, the bar C is elevated to the position indicated by the dotted line C' in Fig. 3, and receives and supports the grain as it is cut by the machine. When a sufficient quantity has accumulated to form a gavel, by giving the bar F a backward movement the bar C is suddenly depressed to the positions shown in Figs. 2 and 3, and the accumulated grain is thereby dropped upon the ground, and the friction upon the ground causes the gavel to remain where desired. The movement of the bar F forward brings the bar C to its original position, ready to receive another gavel.

The bar F being situated contiguous to the driver's seat H, it follows that the whole movement of the parts is completely under his control.

The bar F can be operated either by the foot or hand. The movements are all very certain and effective.

What I claim as my improvement, and desire to secure by Letters Patent, is—

The herein-described combination and arrangement of the bar C, arms D D', bar F, and standard G, for joint operation, as and for the purpose herein described.

G. C. FANCKBONER.

Witnesses:
C. F. WHEELER,
WILLIAM FANCKBONER, Jr.